(12) United States Patent
Etchart Randlett et al.

(10) Patent No.: US 10,240,634 B2
(45) Date of Patent: Mar. 26, 2019

(54) DEVICE AND METHOD OF ANCHORING A POLYMER TO A SUBSTRATE

(71) Applicant: Saint-Gobain Performance Plastics Corporation, Solon, OH (US)

(72) Inventors: Isabelle Etchart Randlett, Watertown, MA (US); Nafih Mekhilef, Shrewsbury, MA (US); Robin M. Bright, Charlton, MA (US); Michael A. Augeri, Leominster, MA (US); Raymond J. White, Agawam, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 209 days.

(21) Appl. No.: 14/940,938

(22) Filed: Nov. 13, 2015

(65) Prior Publication Data

US 2016/0138652 A1 May 19, 2016

Related U.S. Application Data

(60) Provisional application No. 62/079,905, filed on Nov. 14, 2014.

(51) Int. Cl.
*F16C 33/20* (2006.01)
*B05D 3/12* (2006.01)

(52) U.S. Cl.
CPC .............. *F16C 33/205* (2013.01); *B05D 3/12* (2013.01); *F16C 33/208* (2013.01);
(Continued)

(58) Field of Classification Search
CPC .. F16C 33/205; F16C 33/201; F16C 2220/60; F16C 2220/68; Y10T 428/24537; Y10T 428/2457; Y10T 428/24612
See application file for complete search history.

(56) References Cited

U.S. PATENT DOCUMENTS 2,256,647 A * 9/1941 Merrill ................... F16C 33/22
384/98
2,944,917 A 7/1960 Cahne
(Continued)

FOREIGN PATENT DOCUMENTS

CN 2589734 Y 12/2003
CN 1884862 A 12/2006
(Continued)

OTHER PUBLICATIONS

Machine translation of EP 2218929, Aug. 2010.*
(Continued)

*Primary Examiner* — Donald J Loney
(74) *Attorney, Agent, or Firm* — Abel Law Group, LLP; Chi Suk Kim

(57) ABSTRACT

A component for a bearing including a substrate having opposite major surfaces spaced apart by a thickness of the substrate, and a plurality of channels extending along the first surface, at least two of the plurality of channels extending in parallel with each other, wherein at least one of the plurality of channels is adapted to receive and secure a polymeric material to the substrate. A method of forming a bearing including providing a substrate having a opposite major surfaces spaced apart by a thickness, forming channels in the substrate, the channels each having a depth extending from the first major surface toward the second major surface, applying a polymeric material to at least a portion of the first major surface, wherein a portion of the polymeric material occupies at least a portion of at least one of the channels, and curing the polymeric material.

20 Claims, 2 Drawing Sheets

(52) U.S. Cl.
CPC ........ *F16C 33/201* (2013.01); *F16C 2220/60* (2013.01); *F16C 2220/68* (2013.01); *F16C 2240/42* (2013.01); *Y10T 428/2457* (2015.01); *Y10T 428/24537* (2015.01); *Y10T 428/24612* (2015.01)

(56) References Cited

U.S. PATENT DOCUMENTS

| | | | |
|---|---|---|---|
| 3,115,419 A | | 12/1963 | Dale |
| 3,497,278 A | * | 2/1970 | Orndorff, Jr. ........... F16C 33/22 384/98 |
| 3,930,806 A | | 1/1976 | Racz |
| 4,248,915 A | * | 2/1981 | Vinciguerra ............. B05D 3/12 29/524 |
| 4,946,747 A | * | 8/1990 | Bergmann ............... C23C 14/16 29/898.068 |
| 5,033,871 A | * | 7/1991 | Ide ....................... B63H 23/326 384/117 |
| 5,171,621 A | * | 12/1992 | Desbiolles ............. A63B 53/04 428/120 |
| 5,238,311 A | * | 8/1993 | Katou .................. F16C 33/1065 384/288 |
| 6,686,026 B2 | * | 2/2004 | Spiewak .................... B32B 3/00 428/167 |
| 7,244,502 B2 | | 7/2007 | Aronica et al. |
| 7,276,278 B2 | * | 10/2007 | Kamiyama .......... B41M 7/0027 428/167 |
| 9,297,416 B2 | | 3/2016 | Ziegler et al. |
| 2007/0104577 A1 | * | 5/2007 | Hansen ................. F03D 7/0224 416/104 |
| 2007/0234839 A1 | | 10/2007 | Cordivari |
| 2010/0080497 A1 | | 4/2010 | Jaeger et al. |
| 2010/0175918 A1 | * | 7/2010 | Ma ....................... H02G 3/0456 174/481 |
| 2011/0167587 A1 | | 7/2011 | Shimp et al. |
| 2012/0106882 A1 | | 5/2012 | Ponnouradjou et al. |
| 2013/0023451 A1 | | 1/2013 | Matsuhisa et al. |
| 2013/0266761 A1 | | 10/2013 | Ho et al. |

FOREIGN PATENT DOCUMENTS

| | | | |
|---|---|---|---|
| CN | 102869892 A | | 1/2013 |
| CN | 103502665 | | 1/2014 |
| EP | 2218929 A2 | | 8/2010 |
| GB | 815756 A | | 7/1959 |
| JP | 09-112564 | * | 5/1997 |
| JP | 2004019857 A | | 1/2004 |
| JP | 2006198743 A | | 8/2006 |
| JP | 2009530567 A | | 8/2009 |
| JP | 2011208736 A | | 10/2011 |
| WO | 2013079287 A1 | | 6/2013 |
| WO | 2014072729 A1 | | 5/2014 |
| WO | 2014091206 A1 | | 6/2014 |

OTHER PUBLICATIONS

Machine translation of JP 2004-0198857 (Year: 2004).*
Machine translation of JP 09-112564 (Year: 1997).*
International Search Report for PCT/US2015/060630 dated Jan. 8, 2016, 1 page.

* cited by examiner

DEVICE AND METHOD OF ANCHORING A POLYMER TO A SUBSTRATE

CROSS-REFERENCE TO RELATED APPLICATION(S)

This application claims priority under 35 U.S.C. § 119(e) to U.S. Provisional Patent Application No. 62/079,905, filed Nov. 14, 2014, entitled "DEVICE AND METHOD OF ANCHORING A POLYMER TO A SUBSTRATE," by Isabelle Etchart Randlett, et al., which is assigned to the current assignee hereof and incorporated herein by reference in its entirety.

FIELD OF THE DISCLOSURE

The present disclosure relates to a device and method of anchoring a polymer to a substrate.

RELATED ART

It is generally well known that certain polymers resist adhesion with substrates. For example, fluoropolymers are often applied to surfaces to enhance sliding. However, fluoropolymers resist adhering to the surfaces because of their non-adhesive compositions.

Current methods of attaching non-adhesive polymers like fluoropolymers to substrates utilize chemically etched or pickled substrates including pockets or voids into which the polymer is permitted to flow. Such chemically etched pockets provide insufficient peel resistance for certain applications because of their non-selective geometry. Moreover, chemically etched substrates may lack uniform peel resistance as measured at different locations along the substrate-polymer interface. This can result in inconsistent interfacing between the polymer and the substrate, resulting in uneven wear of one or both of the polymer and substrate and undesirable performance over extended use.

The industry continues to demand a method of interfacing a polymer with a substrate in a manner so as to exhibit increased peel resistance above that provided by chemical etching. The industry further demands a more uniform peel resistance along the substrate-polymer interface.

BRIEF DESCRIPTION OF THE DRAWINGS

Embodiments are illustrated by way of example and are not intended to be limited in the accompanying figures.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the mechanical anchoring arts.

Figure 1:
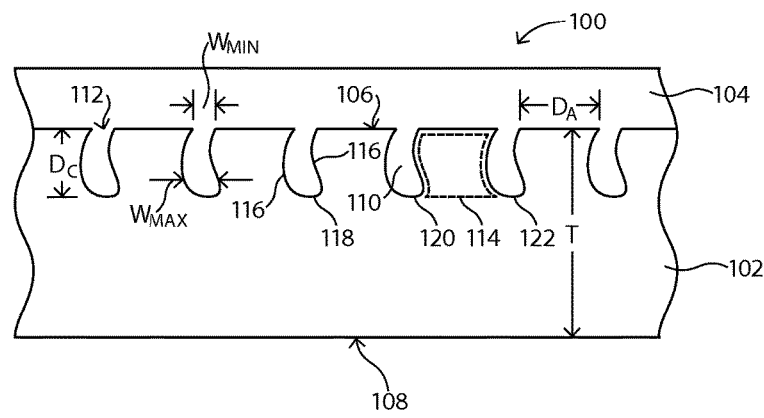
FIG. 1 includes a cross-sectional side view of a portion of a bearing in accordance with an embodiment.

Referring to FIG. 1, a bearing 100 can generally include a substrate 102 and a polymeric material 104. The polymeric material 104 may be secured to the substrate 102 so as to resist peeling therefrom.

The substrate 102 may at least partially include a material such as a metal, an alloy, or a polymer. Exemplary metals include steel and aluminum.

In an embodiment, the substrate 102 may be at least partially coated, or galvanized, with a secondary material (not illustrated). For example, in a particular embodiment, secondary material may be applied to at least a portion of the substrate 102. In a more particular embodiment, the coated secondary material may cover an entire surface of the substrate 102.

The substrate 102 can include opposing major surfaces 106 and 108 spaced apart by a thickness, T. A plurality of channels 110 can extend into the substrate 102 from the major surface 106. Each channel 110 can extend a depth, $D_C$, as measured from the major surface 106 to the major surface 108 in a direction parallel to the thickness, T.

In an embodiment, at least two of the channels 110 can have the same depth as one another. In a further embodiment, all of the channels 110 can have the same depth as each other. In another embodiment, at least two of the channels 110 can extend to different depths into the substrate 102. In a further embodiment, all of the channels 110 can extend to different depths as compared to each other.

In an embodiment, at least one of the channels 110 can have a $D_C$ of at least 0.00001 T, such as at least 0.0001 T, at least 0.001 T, or even 0.01 T. In a further embodiment, at least one of the channels can have a $D_C$ of no greater than 0.99 T, such as no greater than 0.75 T, no greater than 0.5 T, no greater than 0.25 T, or even no greater than 0.1 T.

In an embodiment, $D_C$ can be in a range of 100 µm and 500 µm, such as in a range of 125 µm and 475 µm, in a range of 150 µm and 450 µm, in a range of 175 µm and 425 µm, or even in a range of 200 µm and 400 µm.

In an embodiment, at least two of the channels 110 can be parallel with respect to each other as measured along the major surface 106. In a further embodiment, all of the channels 110 can be parallel with respect to each other.

The channels 110 each have a length, L, extending across the major surface 106 of the substrate 102. In an embodiment, at least one of the channels 110 can extend along an entire length of the substrate 102. In a further embodiment, all of the channels 110 can extend along the entire length of the substrate 102.

In another embodiment, the length of the substrate 102 can be greater than the length of at least one channel 110. For example, the length of the substrate 102 can be at least 1.1 L, such as at least 1.2 L, at least 1.3 L, at least 1.4 L, at least 1.5 L, at least 2 L, at least 3 L, at least 4 L, at least 5 L, at least 10 L, or even at least 20 L. In this regard, at least one of the channels 110 may not extend across the entire length of the substrate.

In an embodiment, at least two sub-channels may extend along the substrate 102 along a single plane to form a column or row of sub-channels. The at least two sub-channels may share a common bisecting line. In an embodiment, at least three sub-channels can lie along a single column, such as at least four sub-channels can lie along a single column, at least 5 sub-channels can lie along a single column, at least 10 sub-channels can lie along a single column, at least 15 sub-channels can lie along a single column, at least 20 sub-channels can lie along a single column, at least 25 sub-channels can lie along a single column, at least 50 sub-channels can lie along a single column, or even at least 100 sub-channels can lie along a single column. In an embodiment, no greater than 10,000 sub-channels can lie along a single column, such as no greater than 5,000 sub-channels can lie along a single column, or even no greater than 2,500 sub-channels can lie along a single column.

Adjacent columns of sub-channels, e.g., channels 120 and 122, may have the same number of sub-channels. Alternatively, a first column of sub-channels may have a first number of sub-channels and a second column of sub-channels may have a second number of sub-channels different from the first number of sub-channels.

In an embodiment, the channels 110 can each define a maximum width, $W_{MAX}$, and a minimum width, $W_{MIN}$. In a particular embodiment, the minimum width of at least one of the channels 110 can be disposed along a plane defined by the major surface 106. The maximum width of at least one of the channels 110 can be disposed along a plane located between the major surfaces 106 and 108.

The channels 110 can each define a width ratio, as measured by a maximum width of the channel 110 to the respective minimum width thereof. In an embodiment, at least one channel 110 can have a width ratio of at least 1.01:1, such as at least 1.1:1, at least 1.2:1, at least 1.3:1, at least 1.4:1, at least 1.5:1, at least 1.6:1, at least 1.7:1, at least 1.8:1, at least 1.9:1, at least 2.0:1, at least 2.25:1, at least 2.5:1, at least 2.75:1, or even at least 3.0:1. In another embodiment, the width ratio can be no greater than 10:1, such as no greater than 9:1, no greater than 8:1, no greater than 7:1, no greater than 6:1, no greater than 5:1, or even no greater than 4:1.

In an embodiment, at least one of the channels 110 can have an ellipsoidal shape when viewed in cross section. At least one of the sidewalls 116 of at least one of the channels 110 may have an arcuate profile when viewed in cross section. In a particular embodiment, a base 118 of the channel 110 can be flat (e.g., FIG. 2). In another embodiment, the base 118 may include a angular junction of opposing sidewalls 116. In this regard, the base 118 may include two sidewalls 116 joined by a relative angle therebetween (e.g., FIG. 3). In yet another embodiment, the base 118 may include a rounded portion (FIG. 1). More particularly, the base 118 can be outwardly rounded.

Figure 2:
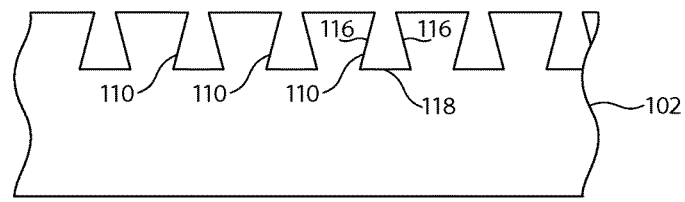
FIG. 2 includes a cross-sectional side view of a portion of a substrate in accordance with an embodiment.

Referring to FIG. 2, in an embodiment, at least one of the channels 110 can have a generally polygonal shape when viewed in cross section. In a more particular embodiment, at least one of the channels 110 can have a generally quadrilateral shape when viewed in cross section. In further non-limiting embodiments, at least one of the channels can have a shape selected from the following shapes: a triangle, a rectangle, a pentagon, a hexagon, a heptagon, an octagon, a nonagon, a decagon, a hendecagon, a dodecagon, or any other suitable arrangement. The shape of the channel may be defined by the sidewalls, base, and a plane extending across the major surface 106 of the substrate 102, so as to define a closed volume.

In a non-limiting embodiment, when viewed in cross section, at least one of the channels 110 can have a shape corresponding to a regular polygon, i.e., the channel includes an equilateral and equiangular disposition. In another embodiment, when viewed in cross section, at least one of the channels 110 can have a shape corresponding to an irregular polygon, i.e., a channel not including both an equilateral and equiangular disposition.

The channels 110 may all be uniform in size and shape with respect to each other. In such a manner, the substrate 102 can have more uniform peel strength independent of location therealong.

Referring again to FIG. 1, in an embodiment, at least one of the channels 110 can have a throttled open end 112. Throttling can be quantified by the width ratio of the channel 110. Specifically, as the width ratio is increased, the channel 110 may be more throttled. A more throttled open end 112 may increase peel resistance between the substrate 102 and the polymeric material 104. Overthrottling, e.g., having a width ratio of greater than 25:1, may weaken peel resistance by unnecessarily thinning the polymer along the major surface 106 as compared to the volume of polymer within the channel 110, thereby causing a weakened polymer structure along the major surface 106.

Channel density may be defined as the surface area of the channels at the open ends 112 compared to the surface area of the substrate 102 including the surface area of the channels at the open ends. In an embodiment, the substrate 102 may have a channel density of at least 1:100, where 1 is the open surface area formed by the channels at the open ends and 10 is the surface area of the substrate 102 including the open surface area formed by the channels at the open ends. In particular embodiments, the average channel density may be at least 1:75, such as at least 1:50, at least 1:25, at least 1:20, at least 1:15, at least 1:14, at least 1:13, at least 1:12, at least 1:11, at least 1:10, at least 1:9, at least 1:8, at least 1:7, at least 1:6, at least 1:5, at least 1:4, at least 1:3, at least 1:2, or even at least 1:1.5. In a further embodiment, the channel density, may be no greater than 1:1.001, such as no greater than 1:1.01, no greater than 1:1.05, no greater than 1:1.1, no greater than 1:1.15, no greater than 1:1.2, no greater than 1:1.25, no greater than 1:1.3, no greater than 1:1.35, no greater than 1:1.4, or even no greater than 1:1.45.

In an embodiment, the channel density may be in a range of 1:001 and 1:1.5.

Adjacent channels, e.g., channels 120 and 122, may be spaced apart a distance, $D_A$, as measured along the major surface 106. In an embodiment, a ratio of $D_A$ to the minimum width of the channels ($W_{MIN}$) may be at least 0.001:1, such as at least 0.01:1, at least 0.01:1, at least 0.5:1, or even at least 1:1. In another embodiment, $D_A:W_{MIN}$ may be no greater than 100:1, such as no greater than 75:1, no greater than 50:1, no greater than 25:1, no greater than 10:1, or even no greater than 5:1.

In an embodiment, a first pair of adjacent channels can have a spacing therebetween equal to a spacing between a second pair of adjacent channels. In a further embodiment, the spacing between adjacent channels can be the same between all adjacent channels. That is, $D_A$ can be the same between all adjacent channels. Equal spacing may enhance uniform peel resistance over the area of the substrate 102.

In another embodiment, the spacing between the first pair of adjacent channels can be different than the spacing between the second pair of adjacent channels.

The channels 110 may each have an open volume, $V_O$, as contained between the sidewalls 116, base 118, and a plane extending along the major surface 106 of the substrate 102. Portions of the substrate 102 disposed between adjacent channels (illustrated, for example, by a volume contained within dashed line 114) may define a closed volume, $V_C$, providing lateral support to the channels 110. In an embodiment, $V_O$ can be no greater than 20 $V_C$, such as no greater than 15 $V_C$, no greater than 10 $V_C$, no greater than 5$V_C$, no greater than 1 $V_C$, no greater than 0.5 $V_C$, or even no greater than 0.25 $V_C$. In a further embodiment, $V_O$ can be at least 0.001 $V_C$, such as at least 0.005 $V_C$, at least 0.01 $V_C$, at least 0.015 $V_C$, or even at least 0.02 $V_C$.

Figure 3:
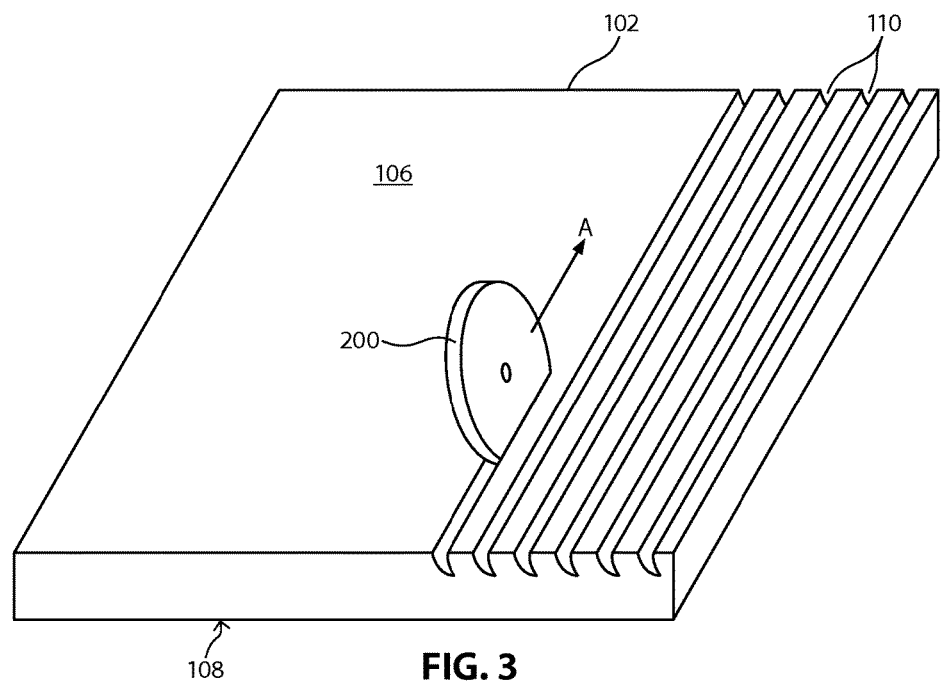
FIG. 3 includes a top perspective view of an exemplary method of forming the bearing in accordance with an embodiment.

FIG. 3 illustrates an exemplary process of forming the channels 110 within the substrate 102 by a mechanical process.

Mechanical formation of the channels may permit more uniform channel placement and geometry as compared to chemical processes, such as chemical etching or pickling. Chemical etching typically includes use of an acidic solution introduced to a surface of a metal substrate. The acidic solution is permitted to contact the substrate and react therewith causing formation of tiny pockets or dimples. These pockets may have varying relative sizes and shapes. Some pockets may have throttled entrances while other pockets may be widest along the surface of the substrate, greatly reducing the relative effectiveness of said pockets. Varying solution composition and molarity may render certain portions of the substrate 102 more or less textured as compared to other portions. Additionally, the acidic solution may render it difficult or even impossible to maintain a planar major surface absent a masking procedure or other similar selective etching process.

Exemplary mechanical processes for forming the channels 110 include: micro-machining, for example, by a micro-wheel, such as a diamond coated micro-wheel, routing, sawing, scraping, drilling; laser etching; high pressure water jetting; and electro deposition machining. After reading this disclosure, skilled artisans will appreciate that other mechanical formation processes may be used.

As illustrated in FIG. 3, a micro-wheel 200 may be passed through a portion of the substrate 102 in a direction A. The depth of the micro-wheel 200 may determine the depth and geometric properties of the channels 110. Upon forming a first channel, one or both of the micro-wheel 200 or the substrate 102 may be translated to allow formation of a second channel adjacent to the first channel. This process may be repeated until a suitable portion of the substrate has been patterned with channels 110.

In an embodiment, the micro-wheel 200 may be passed in a first direction (A) to form a first channel and a second direction (not illustrated) to form a second channel. The first and second directions may be different. For example, the first direction may be opposite the second direction. This may increase productivity and may reduce manufacturing time. In another embodiment, the micro-wheel may form channels when moving only in a single direction along the substrate 102. This may be suitable for use with typical wheels which have single-direction operational capacity.

In a non-illustrated embodiment, at least two micro-wheels can be operated in tandem to form the channels 110. The micro-wheels may be engaged by a single drive shaft and coupled together such that they advance in unison across the substrate 102. Alternatively, the micro-wheels may be independently driven or operate at different relative speeds or spatial arrangements.

In an embodiment, the micro-wheel 200 may be operated such that the central axis thereof is parallel with the major surface 106 of the substrate 102. This may permit the occurrence of certain channel shape configurations within the substrate 102.

In another embodiment, the micro-wheel 200 may be angled relative to the major surface 106 such that the central axis thereof is offset by a relative angle. The relative angle can be at least 1°, such as at least 2°, at least 3°, at least 4°, at least 5°, at least 10°, or even at least 20°. The relative angle can be no greater than 90°. Use of a relative angle may allow for the formation of deeper channels without the bases 118 being formed closer to the opposite major surface 108. That is, channel depth, $D_C$, can be increased without reducing strength of the substrate 102.

In an embodiment, the major surface 106 can have the same, or substantially similar, surface roughness, $R_A$, as measured before and after formation of the channels. The channel formation techniques described herein may be performed such that they do not affect the substrate at locations between adjacent channels. Thus, additional surface qualities such as coatings, finishes, or textures may remain undisturbed. To the contrary, application of a masking layer or other similar selective etch processes is typically required to preserve surface qualities when chemically etching. Such processes may be prohibitively expensive and time consuming.

Figure 4:
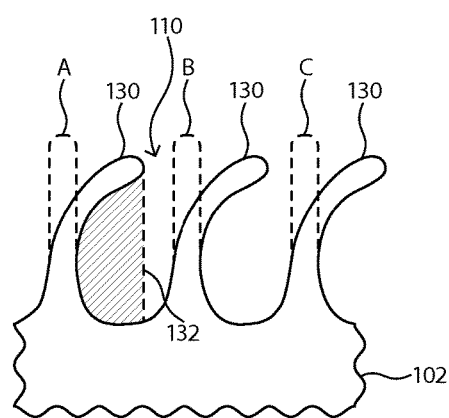
FIG. 4 includes a cross-sectional side view of a portion of the substrate in accordance with an embodiment.

In an embodiment, the substrate 102 may be exposed to heat during formation of the channels 110, e.g., frictional heat formed by a cutting tool. Absorption of such heat may cause the substrate 102 to become soft and malleable. FIG. 4 includes an exemplary cross-sectional view of the substrate 102 after formation of the channels 110. Upon softening, portions 130 of the substrate 102 may curl, e.g., under their own weight, to form arcuate portions. Dashed lines A, B and C represent the portions 130 of the substrate 102 prior to curling. Upon cooling, the portions 130 may regain original mechanical properties of the substrate material.

Skilled artisans will recognize that curling of portions 130 may increase as the ratio of $D_A:W_{MIN}$ decreases, i.e., channel density increases.

The arcuate portions 130 may throttle the channels 110 in a manner as described above. Moreover, the arcuate portions 130 may hood a volume 132 of the channels, thus enhancing peel resistance between the polymeric material and the substrate. In an embodiment, the hooded volume 132 of a first channel 110 may be equal to the hooded volume 132 of a second channel. In a further embodiment, the hooded volume 132 of all channels may be equal. In another embodiment, the hooded volume 132 of a first channel may be different from the hooded volume 132 of a second channel. In a further embodiment, the hooded volume 132 of all channels 110 may be different as compared to each other.

Referring again to FIG. 1, the polymeric material 104 may be applied to the substrate 102 at the major surface 106 upon formation of a suitable number of channels 110 therein.

In an embodiment, the polymeric material 104 may include a low friction material. For example, the polymeric material may include a material having a coefficient of static friction, $\mu_s$, as measured against steel with dry (clean, unlubricated) surfaces, of no greater than 0.6, such as no greater than 0.55, no greater than 0.5, no greater than 0.45, no greater than 0.4, no greater than 0.35, no greater than 0.3, no greater than 0.25, no greater than 0.2, or even no greater than 0.15. In an embodiment, the polymeric material may have a coefficient of static friction, $\mu_s$, as measured against steel with dry (clean, unlubricated) surfaces, of at least 0.02, such as at least 0.03, at least 0.04, at least 0.05, at least 0.06, at least 0.07, at least 0.08, at least 0.09, or even at least 0.1.

In particular embodiments, the polymeric material 104 may include one or more polymers, such as, for example, one or more fluoropolymers.

Exemplary polymers include polytetrafluoroethylene (PTFE), fluorinated ethylenepropylene (FEP), polyvinylidenfluoride (PVDF), polychlorotrifluoroethylene (PCTFE), ethylene chlorotrifluoroethylene (ECTFE), perfluoroalkoxy alkane (PFA), polyacetal, polybutylene terephthalate, polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof.

The polymeric material 104 may be impregnated or saturated with a filler. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. The filler may also include a material marketed by the applicant under the trademark Ekonol®.

In an embodiment, the polymeric material 104 may be applied to the substrate 102 at an elevated temperature, e.g., those temperatures at which the polymeric material 104 may readily flow and deform. The polymeric material 104 may be applied to the substrate 102 by a coating technique, such as, for example, physical or vapor deposition, spraying, plating, powder coating, or through other chemical or electrochemical techniques. In a particular embodiment, the polymeric material 104 may be applied by a roll-to-roll coating process, including for example, extrusion coating. For example, the polymeric material 104 may be heated to a molten or semi-molten state and extruded through a slot die onto the major surface 106 of the substrate 102. In another embodiment, the polymeric material 104 may be cast or molded. Casting and molding can incur through injection techniques or under elevated pressure conditions, e.g., pressures above atmospheric pressure. Alternatively, casting and molding can occur without elevated pressures or without injection techniques.

The polymeric material 104 may be pressed or rolled in a direction toward the major surface 106. Pressing or rolling can occur at elevated temperatures, i.e., the polymeric material 104 is hot-pressed or rolled. A roller may be passed along the polymeric material 104 in a direction parallel with the length of at least one of the channels 104. Alternatively, the roller may be passed along the polymeric material 104 in a direction having a relative angle with respect to the length of at least one of the channels 104. For example, rolling may occur perpendicular to the length of the channels. In another example, rolling may occur at a 45° angle with respect to the length of the channels.

During the application process, the polymeric material 104 may be introduced into the open voids of the channels 110. In an embodiment, the polymeric material 104 may occupy at least 75% of at least one of the channels, such as at least 80% of at least one of the channels, at least 85% of at least one of the channels, at least 90% of at least one of the channels, at least 95% of at least one of the channels, at least 96% of at least one of the channels, at least 97% of at least one of the channels, at least 98% of at least one of the channels, or even at least 99% of at least one of the channels. In a further embodiment, the polymeric material 104 may occupy the entire, or nearly entire, volume of at least one of the channels 110.

In further embodiments, the polymeric material 104 may occupy at least 75% of each of the channels, such as at least 80% of each of the channels, at least 85% of each of the channels, at least 90% of each of the channels, at least 95% of each of the channels, at least 96% of each of the channels, at least 97% of each of the channels, at least 98% of each of the channels, or even at least 99% of each of the channels. In a further embodiment, the polymeric material 104 may occupy the entire, or nearly entire, volume of each of the channels 110.

After suitable engagement with the channels is achieved and sufficient polymeric material 104 is applied to the substrate 102, the polymeric material 104 may be cured. Skilled artisans will recognize that curing may be performed at standard ambient conditions or at conditions more favorable for particular types of polymeric materials.

In an embodiment, the polymeric material 104 may directly contact at least a portion of the substrate 102. In a further embodiment, the polymeric material 104 may directly contact the substrate along the entire major surface 106. In another embodiment, the polymeric material 104 may directly contact the substrate 102 along the sidewalls 116 and base 118 of at least one of the channels 110. In yet a further embodiment, the polymeric material 104 may directly contact the substrate 102 along the entire major surface 106 and along the sidewalls 116 and base 118 of all of the channels 110. Adhesives and intermediary layers between the substrate and the polymeric material are absent in embodiments having direct contact between the substrate and the polymeric material. In said embodiments, peel resistance between the polymeric material and the substrate may be dependent on geometric configuration of the channels.

In another embodiment, the bearing 100 can further include an adhesive (not illustrated) or an intermediary layer (not illustrated) disposed between the substrate and the polymeric material. In a more particular embodiment, the adhesive can be disposed between intermediary layers, each intermediary layer abutting one of the substrate and the polymeric layer.

Figure 5:
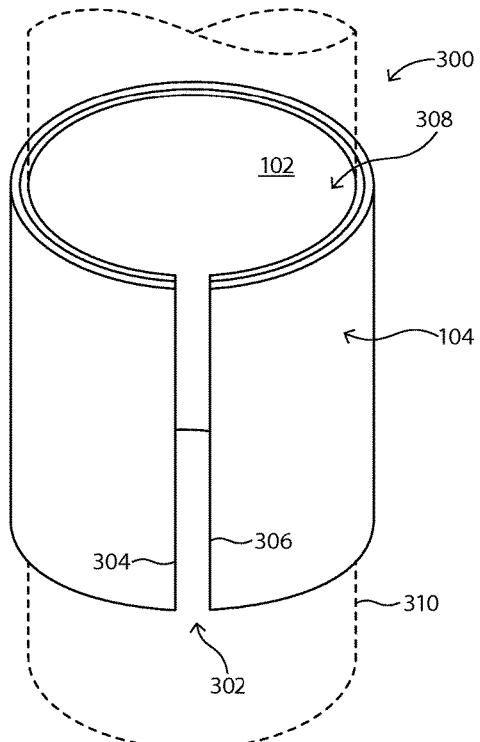
FIG. 5 includes a top perspective view of an annular ring in accordance with an embodiment.

In particular embodiments, the bearing 100 may be shaped or otherwise acted upon to form an annular ring 300 (FIG. 5). In an embodiment, the polymeric material 104 may be disposed radially inside of the substrate 102. In another embodiment, the polymeric material 104 may be disposed radially outside of the substrate 102 (FIG. 5).

In an embodiment, the annular ring 300 may be shaped before application of the polymeric material 104 to the substrate 102. In another embodiment, the annular ring 300 may be shaped after application of the polymeric material 104 to the substrate 102.

The annular ring 300 may include a circumferential gap 302. In particular embodiments, the gap 302 can be closed, for example, by attaching a first and second circumferential ends 304 and 306 of the ring 300 together. Attachment of the circumferential ends 304 and 306 can occur, for example, by welding, e.g., spot welding. In embodiments utilizing temperature sensitive polymeric materials, welding can occur along the substrate only so as to prevent damage to the polymeric material(s) and to avoid melting the polymeric material.

The annular ring 300 may define a central aperture 308 into which a shaft 310 or other mechanical component is insertable. For example, the annular ring 300 may be utilized in high speed applications such as those in industrial machines and automobiles, or in low speed applications such as door hinges.

Figure 6:
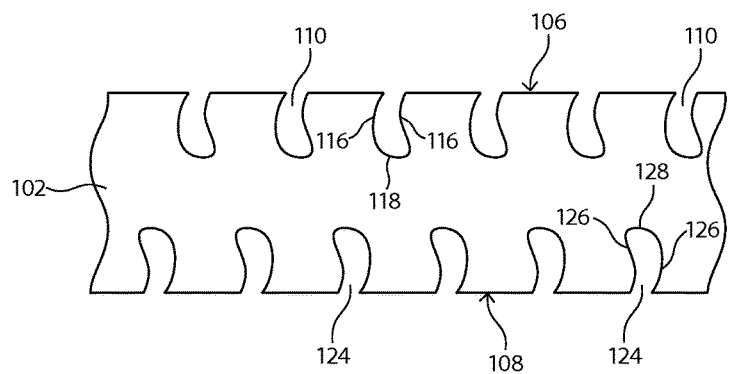
FIG. 6 includes a cross-sectional side view of the substrate in accordance with an embodiment.

FIG. 6 illustrates an alternate embodiment where the substrate 102 includes at least one channel 110 extending from the first major surface 106 and at least one channel 124 extending from the second major surface 108. The channel(s) 124 may have any similar features or structural arrangement as compared to the channel(s) 110. For example, the channel(s) 124 may include two sidewalls 126 similar to sidewalls 116 of channels 110 and a base 128 similar to base 118 of channels 110.

In an embodiment, the channels 110 and 124 may extend into the substrate 102 such that the bases 118 and 128 terminate at different vertical elevations with respect to the major surfaces 106 and 108. In this regard, the bases 118 and 128 of the channel(s) 110 and 124, respectively, may lie along different planes from one another. More particularly, in an embodiment, the base 118 of channel(s) 110 can lie along a first plane, the base 128 of channel(s) 124 may lie along a second plane, and the first and second planes may be offset from one another. The first and second planes may be parallel, i.e., they do not intersect.

In another embodiment, the channels 110 and 124 may extend into the substrate 102 such that the bases 118 and 128 lie along a same plane intersecting the substrate 102 in a direction parallel with the major surface 106 or 108.

Additional polymeric material may be applied along the major surface 108 of the substrate 102 in a manner similar to that applied along the major surface 106. Rolling or pressing may enhance engagement of the polymeric material with the channels 124.

Skilled artisans will appreciate that bearings and annular rings in accordance with embodiments described herein may exhibit greater peel resistance as compared to those engagement methods utilizing chemical etching and pickling processes. Moreover, the bearing and annular rings may have greater uniformity in peel resistance as measured at various locations therealong. This may help to facilitate a more uniform wear profile along the bearing or annular ring and allow the polymeric material to better operate over extended life use.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A component for a bearing comprising:
a substrate having a first and a second opposite major surfaces spaced apart by a thickness of the substrate; and
a plurality of channels extending along the first surface, at least two of the plurality of channels extending in parallel with each other,
wherein at least one of the plurality of channels is adapted to receive and secure a polymeric material to the substrate.

Embodiment 2

A component comprising:
a substrate having a first and a second opposite major surfaces spaced apart by a thickness of the substrate, wherein the substrate includes a plurality of channels each having a depth extending from the first major surface toward the second major surface, the channels having an aspect ratio, as measured by a ratio of the depth of the channel to a maximum width of the channel, and wherein the aspect ratio of at least one of the channels is at least 1:1; and
a polymeric material disposed within at least one of the plurality of channels, the polymeric material covering at least a portion of the first major surface of the substrate.

Embodiment 3

A bearing comprising:
a substrate having:
    a first and a second opposite major surfaces spaced apart by a thickness of the substrate; and
    a plurality of channels extending along the first major surface, at least two of the plurality of channels extending in parallel with each other; and
a polymeric material disposed within at least one of the plurality of channels, the polymeric material covering at least a portion of the first major surface of the substrate.

Embodiment 4

The component or bearing according to any one of the preceding embodiments, wherein the polymeric material directly contacts at least a portion of the first major surface of the substrate.

Embodiment 5

The component or bearing according to any one of the preceding embodiments, wherein the polymeric material directly contacts the entire first major surface of the substrate.

Embodiment 6

The component or bearing according to any one of the preceding embodiments, wherein engagement between the polymeric material and the substrate is adhesiveless.

Embodiment 7

The component or bearing according to any one of embodiments 1-5, further comprising an adhesive disposed between at least a portion of the substrate and the polymeric material.

Embodiment 8

The component or bearing according to any one of embodiments 1-5 and 7, further comprising an intermediate layer disposed between at least a portion of the substrate and the polymeric material.

Embodiment 9

The component or bearing according to any one of the preceding embodiments, wherein each of the channels includes opposing sidewalls, wherein the a first of the opposing sidewalls lies along a first plane, wherein a second of the opposing sidewalls lies along a second plane, and wherein the first and second plane are non-intersecting.

Embodiment 10

The component or bearing according to any one of the preceding embodiments, wherein the channels each define a depth, and wherein the depth of at least one of the channels is between 100 μm and 500 μm.

Embodiment 11

The component or bearing according to any one of the preceding embodiments, wherein all of the channels have an equal depth.

Embodiment 12

The component or bearing according to any one of the preceding embodiments, wherein at least one of the channels is at least partially formed by a diamond micro-wheel.

Embodiment 13

The component or bearing according to any one of the preceding embodiments, wherein at least one of the channels is at least partially formed by a laser.

Embodiment 14

The component or bearing according to any one of the preceding embodiments, wherein at least one of the channels is at least partially formed by electro deposition machining (EDM).

Embodiment 15

The component or bearing according to any one of the preceding embodiments, wherein each channel has an aspect ratio, as measured by a ratio of the depth of the channel to a maximum width of the channel, and wherein the aspect ratio of at least one of the channels is at least 1:1, such as at least 1.1:1, at least 1.2:1, at least 1.3:1, at least 1.4:1, at least 1.5:1, at least 1.6:1, at least 1.7:1, at least 1.8:1, at least 1.9:1, at least 2.0:1, at least 2.25:1, at least 2.5:1, at least 2.75:1, or even at least 3.0:1.

Embodiment 16

The component or bearing according to any one of the preceding embodiments, wherein each channel has an aspect ratio, as measured by a ratio of the depth of the channel to a maximum width of the channel, and wherein the aspect ratio of at least one of the channels is no greater than 10.0:1, such as no greater than 9.0:1, or even no greater than 8.0:1.

Embodiment 17

The component or bearing according to any one of the preceding embodiments, wherein each channel has a width ratio, as measured by a maximum width of the channel to a minimum width of the channel, and wherein the width ratio of at least one of the channels is at least 1.1:1, such as at least 1.2:1, at least 1.3:1, at least 1.4:1, at least 1.5:1, at least 1.6:1, at least 1.7:1, at least 1.8:1, at least 1.9:1, at least 2.0:1, at least 2.25:1, at least 2.5:1, at least 2.75:1, or even at least 3.0:1.

Embodiment 18

The component or bearing according to any one of the preceding embodiments, wherein each channel has a width ratio, as measured by a maximum width of the channel to a minimum width of the channel, and wherein the width ratio of at least one of the channels is no greater than 10.0:1, such as no greater than 9.0:1, or even no greater than 8.0:1.

Embodiment 19

The component or bearing according to any one of embodiments 17 and 18, wherein the minimum width of each channel is located along a plane defined by the first major surface.

Embodiment 20

The component or bearing according to any one of embodiments 17-19, wherein the maximum width of each channel is located between the first and second major surfaces.

Embodiment 21

The component or bearing according to any one of the preceding embodiments, wherein, when viewed in cross section, at least one of the channels has a generally polygonal shape.

Embodiment 22

The component or bearing according to any one of the preceding embodiments, wherein, when viewed in cross section, at least one of the channels has a generally quadrilateral shape.

Embodiment 23

The component or bearing according to any one of the preceding embodiments, wherein, when viewed in cross section, at least one of the channels has a rounded bottom portion, as defined by a portion of the channel closest to the second major surface.

Embodiment 24

The component or bearing according to any one of the preceding embodiments, wherein, when viewed in cross section, all of the channels have a rounded bottom portion, as defined by a portion of the channels closest to the second major surface.

Embodiment 25

The component or bearing according to any one of the preceding embodiments, wherein at least one of the channels extends along an entire length of the first major surface.

Embodiment 26

The component or bearing according to any one of the preceding embodiments, wherein all of the channels extend along an entire length of the first major surface.

Embodiment 27

The component or bearing according to any one of the preceding embodiments, further comprising a plurality of second channels disposed along the second major surface of the substrate.

Embodiment 28

The component or bearing according to any one of the preceding embodiments, wherein the polymeric material comprises a fluoropolymer, such as a PTFE, an FEP, a PCTFE, a PFA, a PEEK, an LCP, a PA, a PI, or a PE.

Embodiment 29

The component or bearing according to any one of the preceding embodiments, wherein the polymeric material is Ekonol-filled.

Embodiment 30

The component or bearing according to any one of the preceding embodiments, wherein the substrate comprises a metal, such as a steel or an aluminum.

Embodiment 31

The component or bearing according to any one of the preceding embodiments, wherein the substrate further comprises a zinc coating.

Embodiment 32

The component or bearing according to any one of the preceding embodiments, wherein adhesion strength between the substrate and polymeric layer is greater than an adhesion strength between an analogous substrate and polymeric layer utilizing an adhesive or pickling.

Embodiment 33

The component or bearing according to any one of the preceding embodiments, wherein at least one of the channels includes a throttled open end;

Embodiment 34

A method of forming a bearing comprising:
providing a substrate having a first and a second opposite major surfaces spaced apart by a thickness;
forming channels in the substrate, the channels each having a depth extending from the first major surface toward the second major surface;
applying a polymeric material to at least a portion of the first major surface, wherein a portion of the polymeric material occupies at least a portion of at least one of the channels; and
curing the polymeric material.

Embodiment 35

A method of forming a bearing comprising:
providing a substrate having a first and a second opposite major surfaces spaced apart by a thickness;
forming channels in the substrate, the channels each having a depth extending from the first major surface toward the second major surface;
shaping the substrate to form an annular ring;
applying a polymeric material to the first major surface, wherein a portion of the polymeric material occupies at least a portion of at least one of the channels; and
curing the polymeric material.

Embodiment 36

The method according to any one of embodiments 34 and 35, wherein the process of forming the channels is not performed by a chemical process.

Embodiment 37

The method according to any one of embodiments 34-36, wherein the process of forming the channels is not performed by chemical etching.

Embodiment 38

The method according to any one of embodiments 34-37, wherein forming the channels is performed by a mechanical process.

Embodiment 39

The method according to any one of embodiments 34-38, wherein the process of forming the channels is performed by:
micro-machining.

Embodiment 40

The method according to any one of embodiments 34-39, wherein the process of forming channels is at least partially performed by:

removing material from the substrate with a diamond micro-wheel.

Embodiment 41

The method according to any one of embodiments 34-40, wherein the process of forming the channels is at least partially performed by:
laser etching the substrate.

Embodiment 42

The method according to any one of embodiments 34-41, wherein the process of forming the channels is at least partially performed by:
spraying a fluid under pressure at the substrate.

Embodiment 43

The method according to any one of embodiments 34-42, wherein the process of forming the channels is at least partially performed by:
electro deposition machining (EDM).

Embodiment 44

The method according to any one of embodiments 34-43, wherein the process of forming the channels is performed such that at least two of the channels are oriented substantially parallel to each other.

Embodiment 45

The method according to any one of embodiments 34-44, wherein the process of forming the channels is performed such that at least two of the channels are oriented parallel to each other.

Embodiment 46

The method according to any one of embodiments 34-45, wherein the process of forming the channels is performed such that all of the channels are oriented parallel to each other.

Embodiment 47

The method according to any one of embodiments 34-46, wherein the process of forming the channels is performed such that, when viewed in cross section, at least one channel has a generally polygonal shape.

Embodiment 48

The method according to any one of embodiments 34-47, wherein the process of forming the channels is performed such that, when viewed in cross section, at least one channel has a generally quadrilateral shape.

Embodiment 49

The method according to any one of embodiments 34-48, wherein the process of forming the channels is performed such that, when viewed in cross section, at least one channel has a rounded bottom portion, as defined by a portion of the channel closest to the second major surface.

Embodiment 50

The method according to any one of embodiments 34-49, wherein the process of applying the polymeric material is performed without depositing an intermediary layer between the substrate and the polymeric material.

Embodiment 51

The method according to any one of embodiments 34-50, wherein the process of applying the polymeric material is performed such that the polymeric material directly contacts the substrate and a portion of at least one of the channels.

Embodiment 52

The method according to any one of embodiments 34-51, wherein the process of applying the polymeric material is performed such that the channels are at least 75% occupied by the polymeric material, such as at least 80% occupied, at least 85% occupied, at least 90% occupied, at least 95% occupied, at least 96% occupied, at least 97% occupied, at least 98% occupied, or even at least 99% occupied.

Embodiment 53

The method according to any one of embodiments 34-52, wherein the process of applying the polymeric material is performed such that the channels are fully occupied by the polymeric material.

Embodiment 54

The method according to any one of embodiments 34-53, wherein the substrate comprises a metal, such as a steel or an aluminum.

Embodiment 55

The method according to any one of embodiments 34-54, wherein the polymeric material comprises a fluoropolymer, such as a PTFE, an FEP, a PCTFE, a PFA, a PEEK, an LCP, a PA, a PI, or a PE.

Embodiment 56

The method according to any one of embodiments 34-55, wherein the polymeric material is Ekonol-filled.

Embodiment 57

The method according to any one of embodiments 34-56, wherein the process of forming the channels is performed such that each channel has an aspect ratio, as measured by a ratio of the depth of the channel to a maximum width of the channel, and wherein the aspect ratio of at least one of the channels is at least 1:1, such as at least 1.1:1, at least 1.2:1, at least 1.3:1, at least 1.4:1, at least 1.5:1, at least 1.6:1, at least 1.7:1, at least 1.8:1, at least 1.9:1, at least 2.0:1, at least 2.25:1, at least 2.5:1, at least 2.75:1, or even at least 3.0:1.

Embodiment 58

The method according to any one of embodiments 34-57, wherein the process of forming channels is performed such that each channel has an aspect ratio, as measured by a ratio of the depth of the channel to a maximum width of the channel, and wherein the aspect ratio of at least one of the channels is no greater than 10.0:1, such as no greater than 9.0:1, or even no greater than 8.0:1.

Embodiment 59

The method according to any one of embodiments 34-58, further comprising:
forming a second plurality of channels in the substrate extending from the second major surface toward the first major surface.

Embodiment 60

The method according to any one of embodiments 34 and 36-59, further comprising:
shaping the substrate and polymeric material to form an annular ring.

Embodiment 61

The method according to any one of embodiments 35 and 60, wherein the polymeric material is disposed radially inside of the substrate.

Embodiment 62

The method according to any one of embodiments 35 and 54, wherein the polymeric material is disposed radially outside of the substrate.

Embodiment 63

The method according to any one of embodiments 35 and 60-62, further comprising:
attaching a first and a second circumferential ends of the annular ring together.

Embodiment 64

The method according to embodiment 63, wherein the step of attaching the first and second circumferential ends is performed by welding.

Embodiment 65

The method according to embodiment 64, wherein welding of the first and second circumferential ends is performed on the substrate.

Embodiment 66

The method according to any one of embodiments 64 and 65, wherein welding does not expose the polymeric material to a melting temperature of the polymeric material.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A component for a bearing comprising:
a substrate having a first and a second opposite major surfaces spaced apart by a thickness of the substrate; and
a plurality of channels extending along the first surface, at least two of the plurality of channels extending in parallel with each other,
wherein at least one of the plurality of channels is adapted to receive and secure a polymeric material to the substrate, wherein at least one channel defines a width ratio, as measured by the maximum width of the channel to the minimum width thereof, of at least 1.01:1, wherein the polymeric material occupies at least 75% of at least one of the channels, wherein at least one of the channels includes a throttled end, and wherein portions of the substrate comprise arcuate portions comprising curled regions that form the throttled end.

2. The component according to claim 1, further comprising a plurality of second channels disposed along the second major surface of the substrate.

3. The component according to claim 1, wherein the minimum width of each channel is located along a plane defined by the first major surface.

4. The component according to claim 1, wherein, when viewed in cross section, at least one of the channels has a rounded bottom portion, as defined by a portion of the channel closest to the second major surface.

5. A bearing comprising:
a substrate having:
a first and a second opposite major surfaces spaced apart by a thickness of the substrate; and
a plurality of channels extending along the first major surface, at least two of the plurality of channels extending in parallel with each other; and
a polymeric material disposed within at least one of the plurality of channels, the polymeric material covering at least a portion of the first major surface of the substrate, wherein at least one channel defines a width ratio, as measured by the maximum width of the channel to the minimum width thereof, of at least 1.01:1, wherein the polymeric material occupies at least 75% of at least one of the channels, wherein at least one of the channels includes a throttled end, and wherein portions of the substrate comprise arcuate portions comprising curled regions that form the throttled end.

6. The bearing according to claim 5, wherein the minimum width of each channel is located along a plane defined by the first major surface.

7. The bearing according to claim 5, wherein, when viewed in cross section, at least one of the channels has a rounded bottom portion, as defined by a portion of the channel closest to the second major surface.

8. The bearing according to claim 5, wherein at least one of the channels extends along an entire length of the first major surface.

9. The bearing according to claim 5, further comprising a plurality of second channels disposed along the second major surface of the substrate.

10. The bearing according to claim 5, wherein the substrate further comprises a zinc coating.

11. The bearing according to claim 1, wherein the at least one channel has an arcuate sidewall when viewed in cross-section.

12. The bearing according to claim 5, wherein the at least one channel has an arcuate sidewall when viewed in cross-section.

13. The bearing according to claim 1, wherein the substrate has an average channel density of at least 1:75.

14. The bearing according to claim 1, wherein the substrate has an average channel density of no greater than 1:01.

15. The bearing according to claim 1, further comprising an adhesive disposed between at least a portion of the substrate and the polymeric material.

16. The bearing according to claim 5, further comprising an adhesive disposed between at least a portion of the substrate and the polymeric material.

17. The bearing according to claim 1, further comprising an intermediate layer disposed between at least a portion of the substrate and the polymeric material.

18. The bearing according to claim 5, further comprising an intermediate layer disposed between at least a portion of the substrate and the polymeric material.

19. The bearing according to claim 1, wherein at least one of the channels has an ellipsoidal shape when viewed in cross section.

20. The bearing according to claim 1, wherein at least one of the channels has a generally polygonal shape when viewed in cross section.

* * * * *